March 5, 1940.   H. M. NORMAN ET AL   2,192,714
ELECTRIC THROTTLE CONTROL
Filed May 20, 1937   6 Sheets-Sheet 1
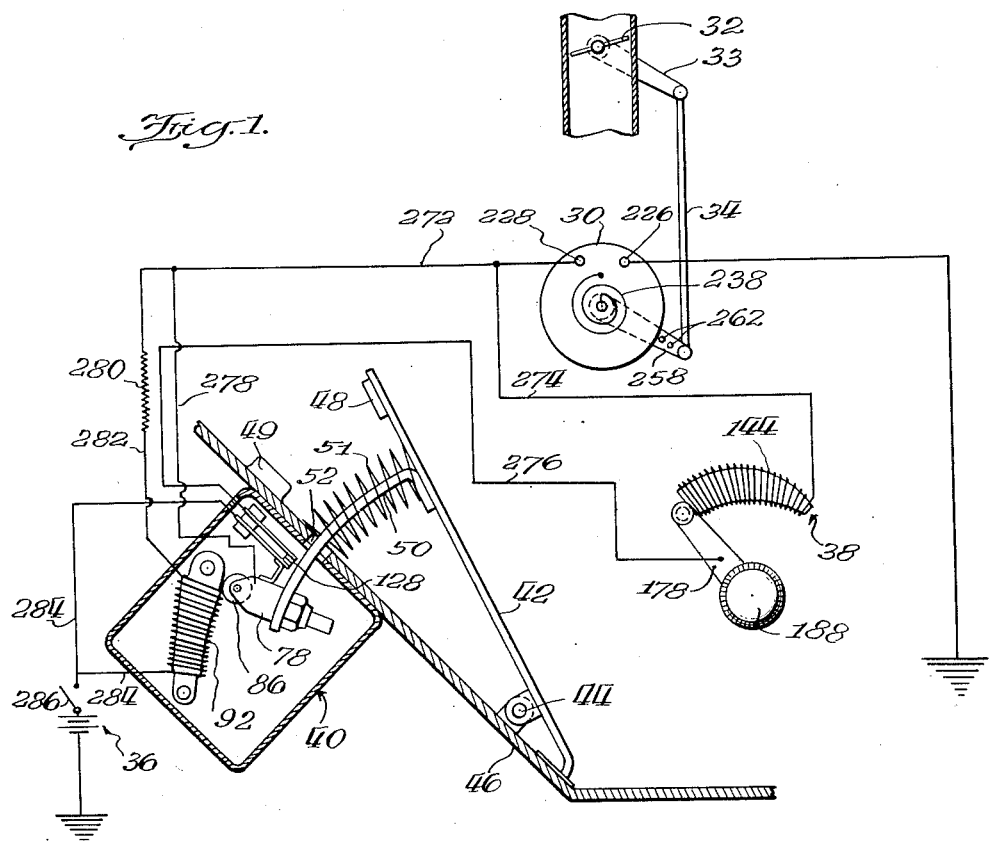
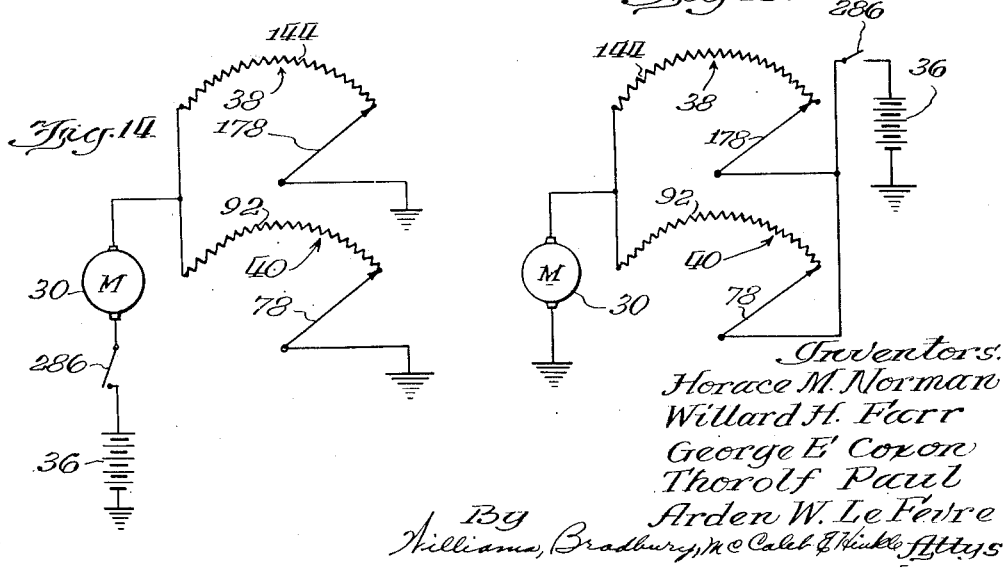
Inventors:
Horace M. Norman
Willard H. Farr
George E. Coxon
Thorolf Paul
Arden W. LeFevre
By Williams, Bradbury, McCaleb & Hinkle Attys.

March 5, 1940.  H. M. NORMAN ET AL  2,192,714
ELECTRIC THROTTLE CONTROL
Filed May 20, 1937   6 Sheets-Sheet 2
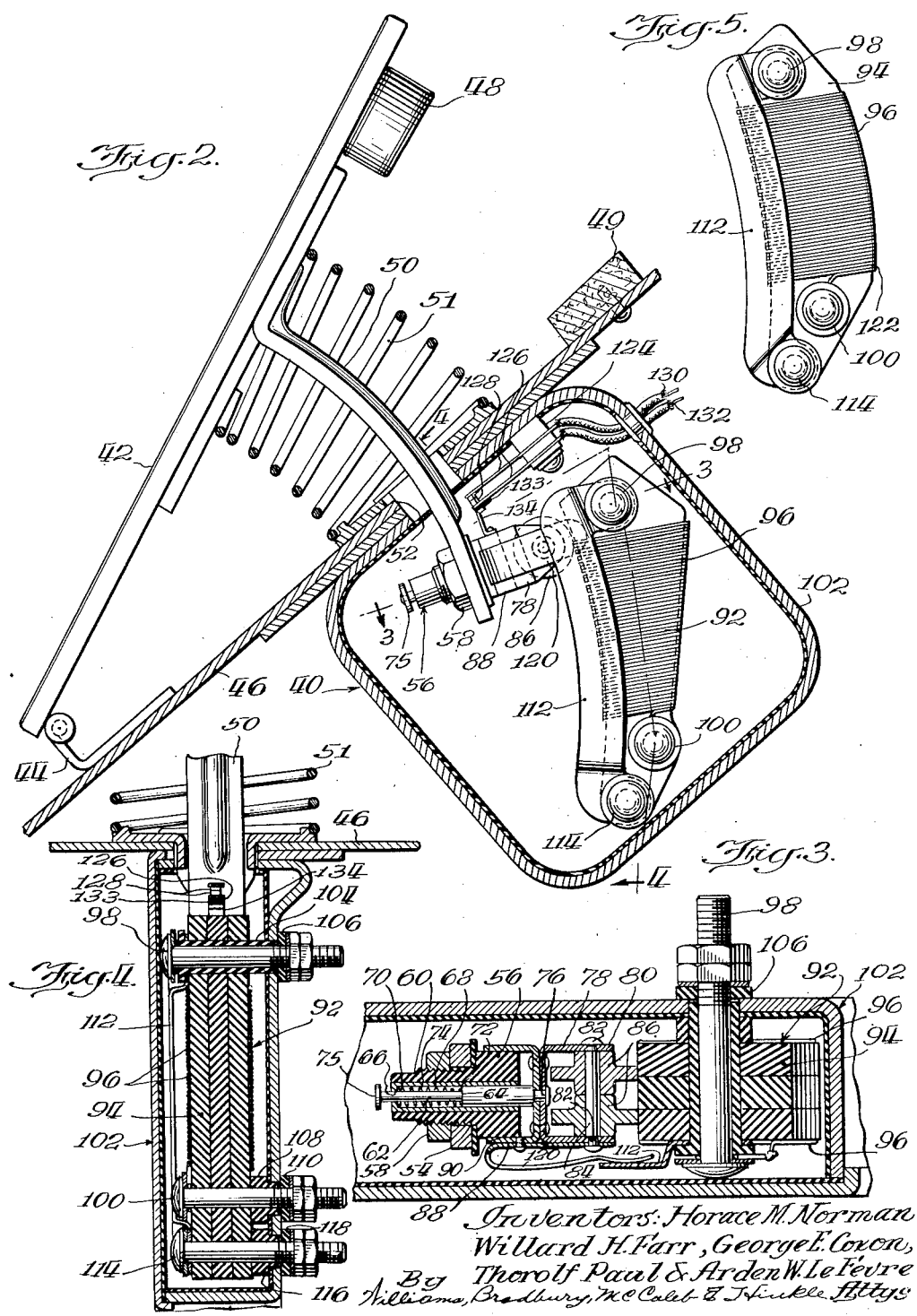

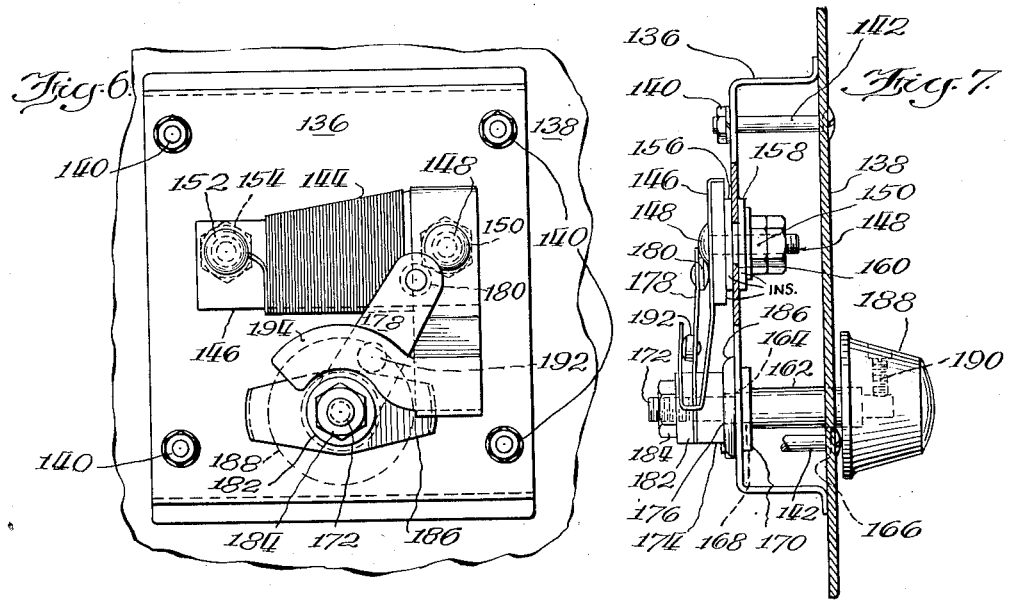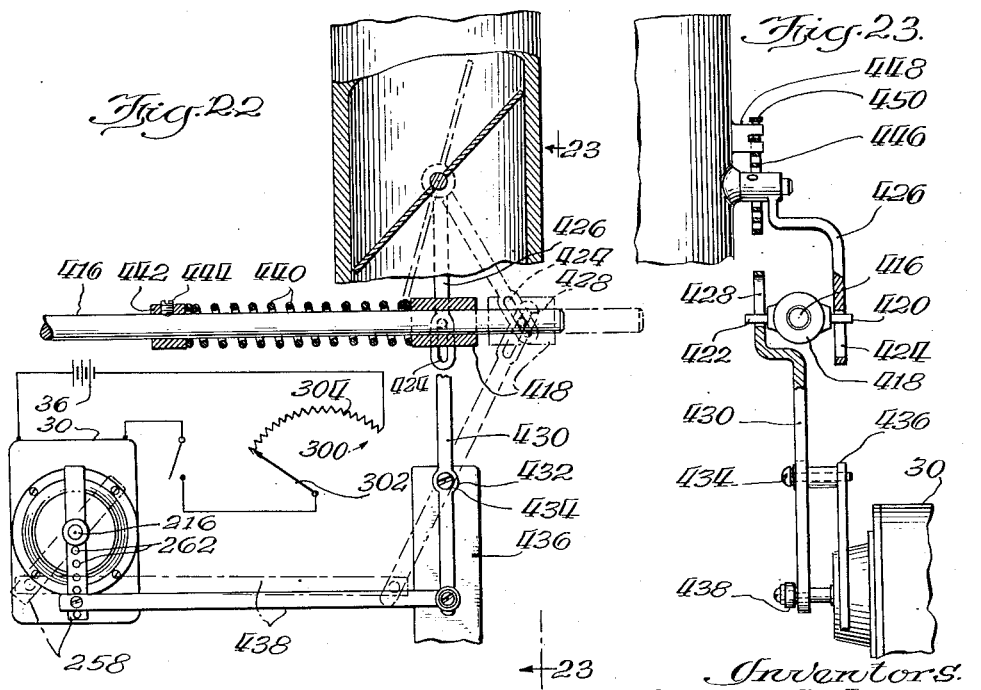

March 5, 1940. H. M. NORMAN ET AL 2,192,714
ELECTRIC THROTTLE CONTROL
Filed May 20, 1937 6 Sheets-Sheet 4
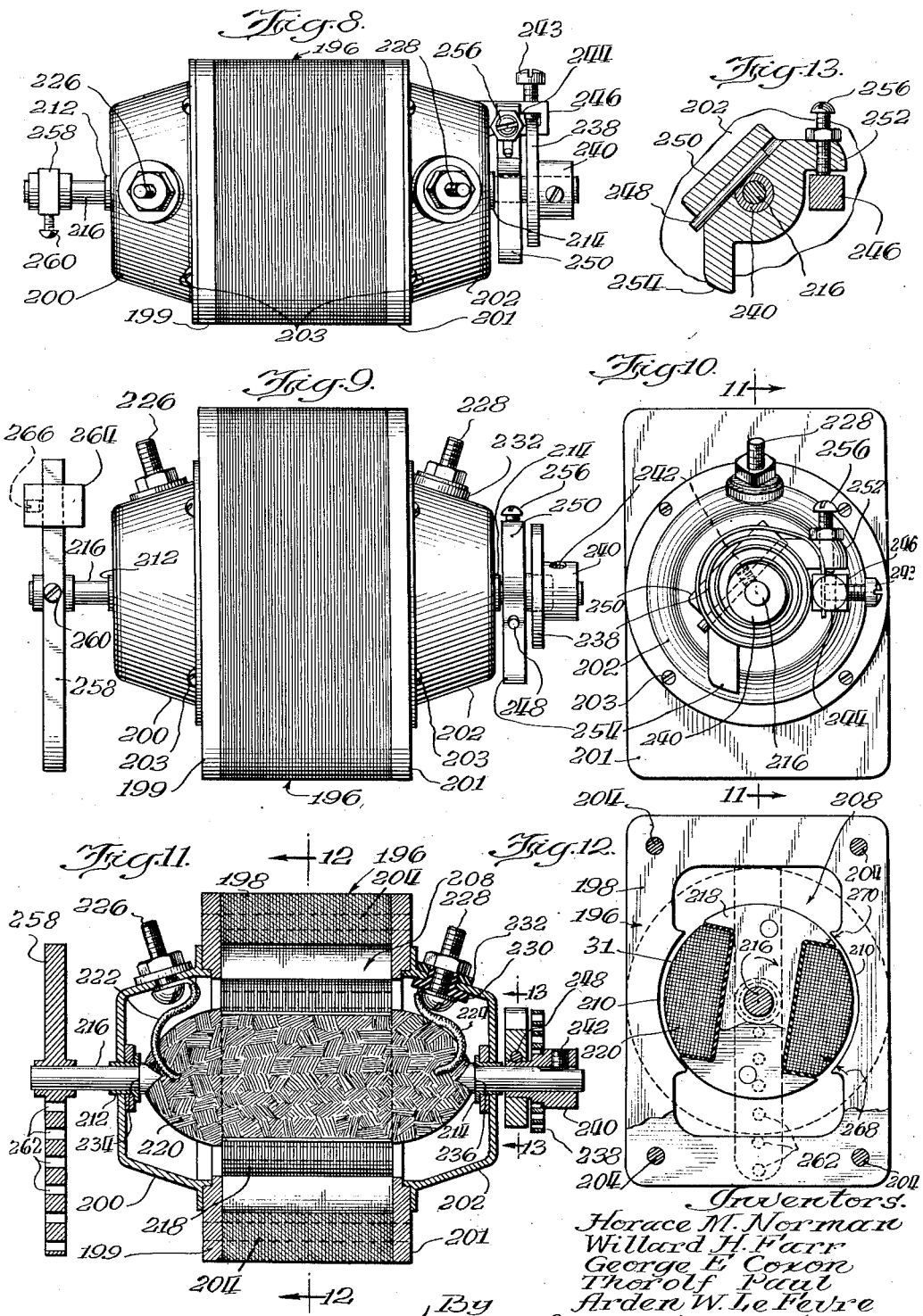

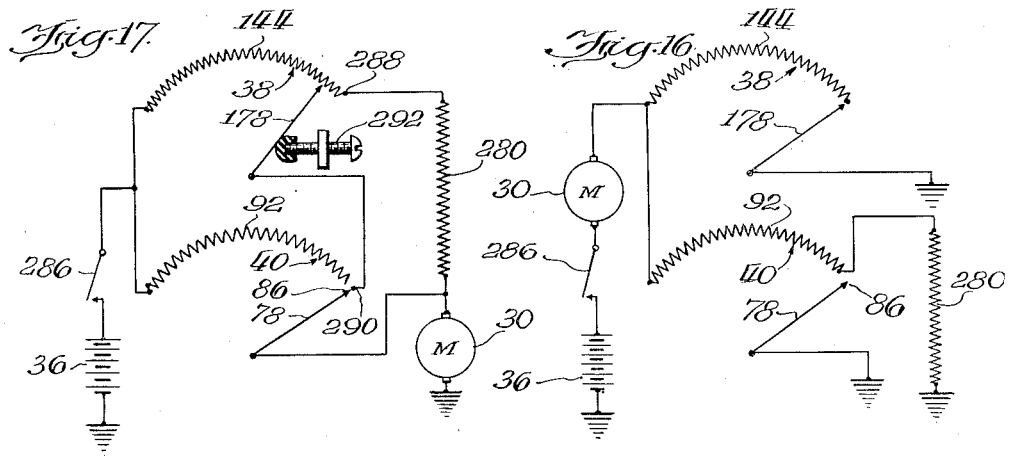
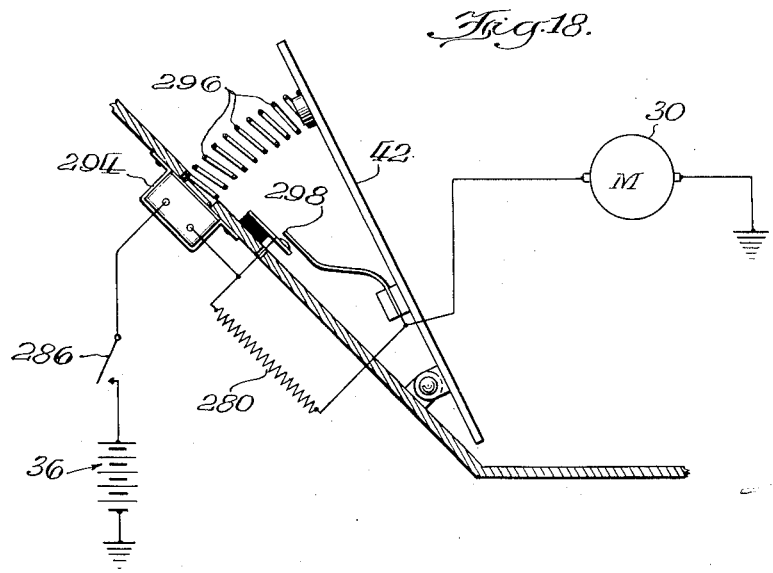

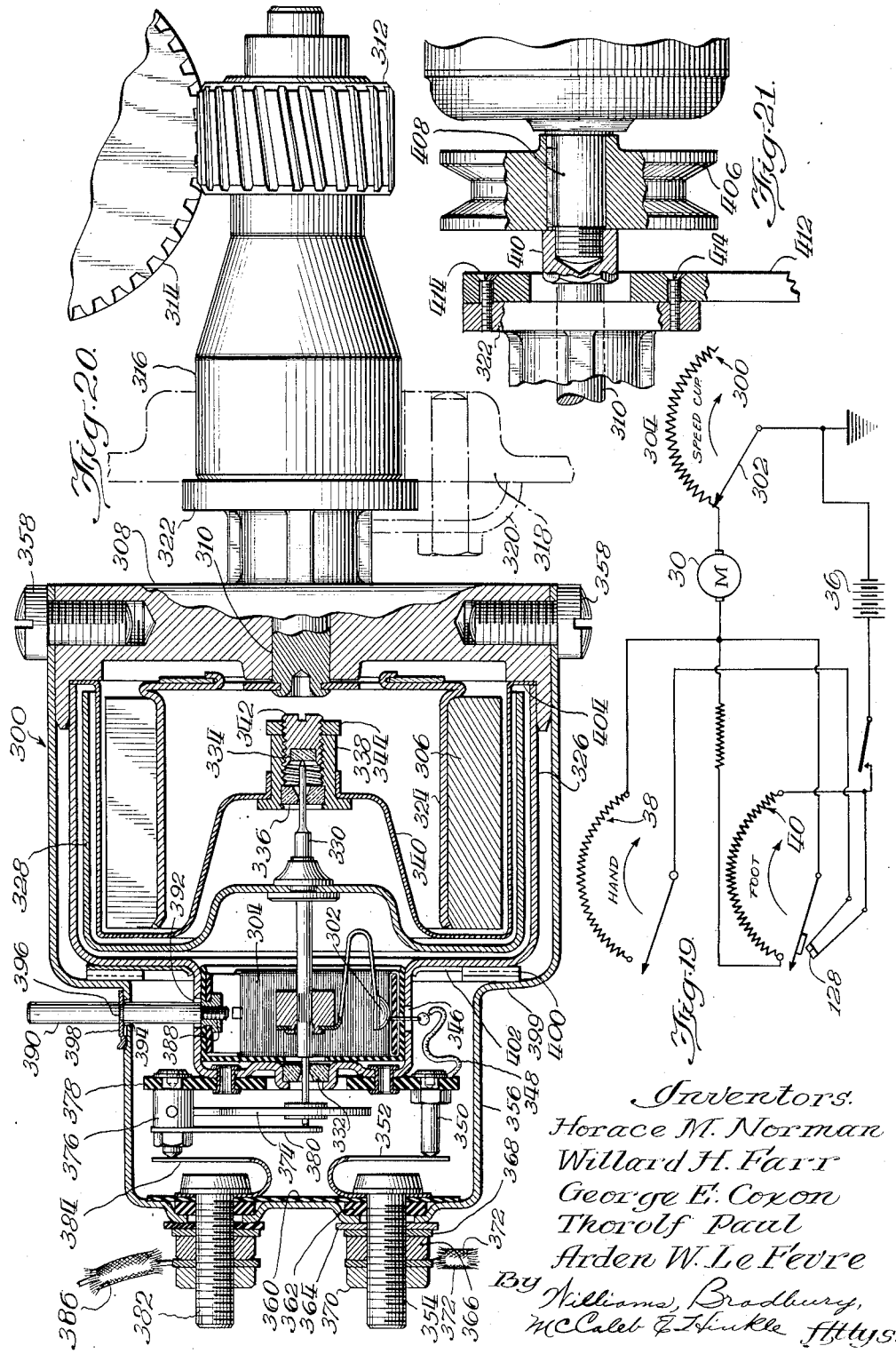

Patented Mar. 5, 1940

2,192,714

UNITED STATES PATENT OFFICE 2,192,714

ELECTRIC THROTTLE CONTROL

Horace M. Norman, Willard H. Farr, George E. Coxon, Thorolf Paul, and Arden W. Le Fevre, Chicago, Ill., assignors to Stewart-Warner Corporation, Chicago, Ill., a corporation of Virginia Application May 20, 1937, Serial No. 143,862

16 Claims. (Cl. 137—139)

This invention relates to electric throttle controls, and more particularly to an electric means for controlling the throttle valve of an automobile.

The throttle valve of an automobile is ordinarily under the control of the operator by means of an accelerator pedal and hand throttle, both of which are connected to the carburetor throttle valve by mechanical linkage. A disadvantage of this system is that when engines are placed at the rear of the vehicle, as is now being done, especially in buses and in some pleasure cars, this mechanical linkage becomes increasingly difficult to incorporate into the automobile in a satisfactory manner.

To be efficient the throttle control system of an automobile should respond readily to slight pressure on the throttle and should be smooth and sure in operation. The system should be free from rattles and should obstruct as little as possible the servicing of the automobile.

An object of this invention is to provide a mechanism in which the foot and hand throttle controls actuate the throttle of the carburetor through an electrical system.

Another object is to provide a carburetor control system in which the accelerator pedal gives full control of the engine speed independently of the hand throttle setting.

Another object is to provide a carburetor control that requires very little pedal pressure and is smooth in operation regardless of the placement of the engine in the vehicle.

A further object is to provide a carburetor control in which slight displacement during a portion of its stroke will cause a relatively great change of resistance in the control circuit while at a different part of its stroke a large displacement of the control will cause a relatively small change of resistance.

A further object is to provide an electric speed governor that is especially adapted to be incorporated into an electric throttle control system, but with certain modifications may be used with a mechanical throttle control.

Another object is to provide means in an electric throttle control for cutting out the influence of the hand control when the foot control is depressed.

A further object is to prevent burning of the several contact points in an electric throttle control system.

A further object is to provide a throttle valve actuating torque motor that has substantially straight line torque characteristics.

Other objects and advantages of this invention will become apparent from the following description which relates to a preferred embodiment of this invention.

In the accompanying drawings, forming a part of this specification, and in which like numerals are employed to designate like parts throughout the same, Figure 1 is a diagrammatic representation of a preferred embodiment of the control device shown connected to a throttle valve;

Figure 2 is a vertical section of the foot control unit;

Figure 3 is a sectional view of the device shown in Figure 2 taken in the direction of the arrows along the line 3—3 of Figure 2;

Figure 4 is a sectional view of the device shown in Figure 2 taken in the direction of the arrows along the line 4—4 of Fig. 2;

Figure 5 is a side plan view of an alternative resistance unit to be used in the device shown in Fig. 2;

Figure 6 is a front plan view of the hand throttle control unit;

Figure 7 is a side plan view of the device shown in Fig 6;

Figure 8 is a top plan view of the throttle valve shifting torque motor;

Figure 9 is a side plan view of the torque motor shown in Fig. 8;

Figure 10 is an end plan view of the torque motor shown in Figures 8 and 9;

Figure 11 is a sectional view of the torque motor shown in Figures 8, 9 and 10 taken in the line 11—11 of Fig. 10;

Figure 12 is a sectional view of the torque motor shown in Figs. 8, 9, 10 and 11 taken in the direction of the arrows along the line 12—12 of Fig. 11;

Figure 13 is a sectional view of a detail of the torque motor taken in the direction of the arrows along the line 13—13 of Fig. 11;

Figures 14, 15, 16, and 17 are circuit diagrams for alternative control devices according to this invention;

Figure 18 is a diagrammatic representation of an alternative throttle valve control device;

Figure 19 is a circuit diagram showing the sending unit of an electrical speed governor connected with the electric throttle control circuit;

Figure 20 is a longitudinal sectional view of a sending unit of an electric speed governor according to this invention;

Figure 21 is a fractional view partly in section of a modification of the device shown in Figure 20;

Figure 22 is a longitudinal partial sectional view of a receiving unit of an electric speed governor adapted to be used with a mechanically controlled throttle valve. It is shown diagrammatically connected to a sending unit such as shown in Fig. 20;

Figure 23 is a view partly in section in the direction of the arrows along the line 23—23 of Fig. 22.

Referring to Fig. 1 of the drawings, in which is shown a diagrammatic representation of an embodiment of the invention, the electric throttle control system consists of a torque motor 30 linked to the carburetor throttle valve 32 by means of the arm 33 and link 34. Connected to this torque motor is an electric circuit including a battery 36, commonly supplied with the automobile, a hand throttle control 38, and a foot control 40. In this instance the foot control, Figs. 2, 3 and 4, consists of a foot pedal 42, pivoted on a hinge 44 connected to the floor board 46 of the automobile.

The upper end of the pedal is provided with a depending stop 48, and the floor board with a similar stop 49. When the pedal is depressed, these stops are brought together and limit the motion of the foot pedal. Fastened to the lower side of the foot pedal is a depending arm 50, which passes through a hole 52 in the floor board, and is provided at its lower end with a hole 54. A coil spring 51 surrounds the arm 50 and presses with its ends against the floor board 46 and pedal 42, thereby moving the pedal 42 upwardly when the foot pressure is released. Through the hole 54 a bushing 56 is secured to the arm 50 by means of the nut 58. The bushing 56 is provided with an axial hole 60 through which extends a rod 62, the upper half of which is cut away at 64 to a smaller diameter, and passes through a hole 66 fitted thereto in the upper end of the bushing 56.

In the space 68 between the inside end of the bushing 70 and the annular ridge 72 on the rod 62 and surrounding the shaft 64, is a coil spring 74 which urges the lower end of the rod 62 outwardly from the bushing. The upper end of the rod 62 is provided with a button 75 that limits its outward movement during the assembly or disassembly of the unit. The lower end of the rod is riveted at 76 to a roller carrying bracket 78.

This bracket consists of two U-shaped metal stampings riveted together at their central portions to form a member of H-shaped section. The outwardly projecting fingers 80 of this bracket are provided with aligned holes 82, through which passes a shaft 84. As shown in Fig. 3, this shaft carries two rollers 86, the peripheries of which have a thinner section than the hubs.

The upper arms 88 of the H-shaped bracket serve as guides and are in slidable relation to the lower section 90 of the bushing 56. This lower section 90 is squared so that the bracket and rollers are free to move inwardly and outwardly against the pressure of the spring 74, but are prevented from rotational movement.

Positioned adjacent the rollers 86 is a resistance unit 92, which consists of a block 94 built up of several thicknesses of insulating material. The surface of the block adjacent the wheels 86 is of arcuate shape so that as the pedal is depressed and the bracket and wheels attached thereto are moved downwardly in an arc, the spring 74 will urge the wheels 86 into contact with the resistance unit throughout the travel of the pedal 42. Wound around the insulating block 94 is a coil of resistance wire 96, connected at one end to the binding post 98 and at the other end to the binding post 100. These binding posts 98 and 100 also serve to secure the resistance unit 92 within the box-shaped case 102. The upper post 98 is insulated from the case 102 by means of the insulating sleeve 104 and washer 106, while the lower post 100 is similarly insulated by the sleeve 108 and washer 110.

A contact bar 112 extending the length of the resistance unit 92 is secured thereto at the top by means of the post 98 and at the lower end by the binding post 114. The upper post 98 is insulated from the bar 112 by the sleeve 104 while the lower post 114 serves as an electrical connection for the bar 112 and is insulated from the case 102 by the sleeve 116 and the washer 118. A spring strip 120 is secured to the bracket 78 and is resiliently held in contact with the inside surface of the bar 112. It will be seen that as the rollers 86 are moved upwardly and downwardly by the pedal 42, the spring 74 urges the rollers into contact with the resistance coil 96, the ends of which are connected to the binding posts 98 and 100, while the third binding post 114 makes contact with the rollers through the bar 112 and spring strip 120.

The resistance coil 96 is tapered, being larger at its upward end than at the lower end, therefore, since each turn of the coil near its upward end is longer than a similar turn farther down on the resistance unit, it will be seen that the depression of the pedal a unit distance near the upward end of its stroke will cause a greater change of resistance in the circuit than will a similar movement of the pedal farther down in its stroke. The advantage in using this tapered resistance unit is that it causes a more even deflection of a carburetor valve opening torque motor, to be later described, in proportion to the deflection of the foot pedal 42.

Figure 5 shows an optional resistance unit that may be used in place of the tapered unit 92, if it is desired to secure a constant change of resistance throughout the stroke of the pedal 42. In this unit all of the turns 122 are of substantially the same size, instead of being graduated as are those of the unit 92.

In some of the embodiments of the device to be pointed out later an insulating post 124 secured inside the case 102 supports a pair of spring strips 126 provided with contact points 128. These strips are insulated from each other and from the case, and are normally at rest with the contact points 128 separated, thereby breaking a circuit across the leads 130 and 132. An insulating strip 133 is secured to the lower surface of the lower strip 126. The upper surface of the bushing 56 is provided with an upwardly extending finger 134 which engages the insulating strip 133 and urges the two contact points 128 together when the pedal 42 is in its upward position, thereby closing the circuit across the leads 130 and 132. How these leads 130 and 132 are utilized in a control system will be pointed out later.

The hand throttle control, best shown in Figs. 6 and 7, comprises a sub-panel 136 secured to the rear side of the automobile instrument panel 138 by nuts 140 and bolts 142. A resistance coil 144 is wound on a tapered block 146 which is secured to the sub-panel 136 by screws and nuts numbered 148 and 150 at the large end and 152 and 154 at the small end, and is insulated therefrom by the fiber washers 156, 158 and 160.

A shaft 162 extends through aligned holes 164 and 166 in the sub-panel 136 and instrument panel 138 and is provided with a reduced portion 168 carrying a thrust washer 170 which bears against the front surface of the sub-panel and limits the inward movement of the shaft. On the back side of the sub-panel 136 the shaft 162 has a threaded portion 172 of still smaller diameter on which are placed in order, a spacing bushing 174 which rests against the shoulder 176, a spring finger 178 provided with a contact button 180, which rests against the resistance coil 144, a washer 182 and a nut 184 threaded to the shaft to secure the above series of parts rigidly thereto. Between the back surface of the subpanel 136 and the bushing 174 is positioned a leaf spring 186 which urges the shaft 162 and assembly thereon inwardly, thereby allowing rotation of the shaft 162 by the knob 188 secured thereto at the outer end by the set screw 190, but still providing sufficient friction to retain the shaft 162 and spring finger 178 at any desired setting.

A contact button 192 secured to the back surface of the spring contact finger 178 rests against an arcuate contact member 194 which is bent under at the end and secured to the screw 148. The screw 148 also serves as a binding post to connect this member 194 into an electrical circuit. The screw 152 at the other end of the resistance block 146 is connected to the small end of resistance coil 144 and serves as a binding post therefor.

It will be seen that if the binding posts 148 and 152 are connected in an electrical circuit, the resistance of the circuit may be varied by turning the knob 188.

The torque motor 30 illustrated in detail in Figs. 8 to 13 is provided with a magnetic flux conducting field 196 built up of a plurality of laminated sheets 198 secured between the end plates 199 and 201 by the rivets 204. The laminated sheets 198 are rectangular in shape with a central opening which is cut away at the ends to provide an unobstructed space 208 with arcuate pole pieces 210. The end housings 200 and 202 are secured to the end plates 199 and 201 by screws 203 and have central openings provided with bearing bushings 212 and 214 through which extends an armature shaft 216 to which is secured an armature core 218 between the pole pieces 210. The armature core is of the well known H type and is provided with a coil 220 of insulated wire wound thereon, the ends of which are brought out through the pig tails 222 and 224. These pig tails, which have an insulating covering, are connected to the binding posts 226 and 228, one of which, 228 is insulated from the end housing by the insulating bushing 230 and washer 232. The ends of the shaft 216 where they pass through the bushings 212 and 214 are cut away to a smaller diameter to provide shoulders 234 and 236 which act as thrust bearings against the inner ends of the bushings 212 and 214 to limit endwise motion of the shaft and armature 218.

A helical spring 238 is coiled around the right hand end of the motor shaft 216 as seen in Fig. 11, and is attached at its inner end to a collar 240 secured to the shaft 216 by the set screw 242. The other end of the spring 238 is secured by a screw 243 in a slot 244 provided in a square post 246 which is secured to the motor end housing 202 in any suitable manner such as by welding. By means of this spring 238 the armature 218 is biased in a clockwise direction as seen in Fig. 10.

Secured to the collar 240 by means of the pin 248 is a flat member 250 with two outstanding arms 252 and 254 perpendicular to each other. These two arms serve as stops operating against the post 246 to limit the degree of rotation of the armature 218 and shaft 216. As shown, one of these arms, 252, is provided with a screw 256 extending therethrough to serve as an adjustment for setting the position the armature 218 will take when unenergized.

The other end of the shaft 216 is provided with an arm 258 secured thereto by the set screw 260. The arm 258 has on one side of the shaft 216 a plurality of holes 262 any one of which may be used to connect the link 34 (Fig. 1) which links with the carburetor throttle valve 32 through the arm 33. Which one of these holes 262 is to be used depends upon how much movement is required of the link 34, since the holes 262 farther from the shaft 216 will give greater movement than those near the hub. On the other side of the shaft 216 (Fig. 9) the arm 258 may be provided with an adjustable counterbalance weight 264 held in place by the set screw 266. This weight may be moved on the arm 258 to a position which gives a proper balance to the reciprocating parts thereby providing smoother operation in the device.

When the armature is unenergized, it comes to rest with its poles canted with respect to the field poles 210, so that when energized, it will always start to rotate in a clockwise direction as seen in Fig. 12. Notice also that the field poles 210 are specially shaped, so that the gap between the entering edge of the armature and the field becomes progressively larger for greater movement of the armature. That is, the gap at 268 is greater than the gap at 270. This is done so as to give torque changing characteristics in the motor opposite to those in the spring 238, thereby giving the armature a dead beat action when the current therethrough is quickly increased or decreased.

In Fig. 1, the torque motor 30 is shown with its arm 258 connected to the carburetor valve 32 by the rod 34 and arm 33. The terminal 226 is grounded while the other terminal 228 is connected through the hand throttle control 38 to one of the contacts 128 by the conduits 272, 274 and 276. The conduit 272 also is connected to the roller 86 of the foot control by conduit 278 and to the large end of the resistance unit 92 through a high resistance unit 280 and conduit 282. The other contact point 128 is connected to the small end of the resistance unit 92 by the conduit 284 and to the ground through the conduit 284, an automobile ignition switch 286, and the battery 36.

In operation when the ignition switch is on and both the foot and hand controls are in the idling positions, no current will flow through the circuit excepting for a small amount that is able to leak through the circuit comprising the motor 30, conduit 272, high resistance 280, conduit 282, resistance unit 92, conduit 284, switch 286 and battery 36. The small amount of current that flows in the above circuit is not sufficient to energize the motor 30, nor to cause any appreciable wastage, consequently, the throttle valve 32 remains closed.

If the hand throttle 38 is opened somewhat, the motor 30 is energized through conduits 272 and 274, variable resistor 38, conduit 276, switch points 128, conduit 284, switch 286 and battery 36. As the resistance 38 is decreased, the flow of current becomes greater and motor 30 is more highly energized thereby producing more torque and opening the valve 32 wider through the linkage 258, 34 and 33.

If the foot pedal 42 is depressed, the contact points 128 spring apart and break the circuit through the hand control, and simultaneously the roller 86 comes in contact with the resistance coil 92, thereby energizing the motor 30 through the conduits 272 and 278, roller 86, coil 92, conduit 284, ignition switch 286 and battery 36. As the pedal 42 is depressed further the resistance in the circuit will be lowered and the motor 30 further energized.

The high resistance unit 280 is used in the above and other circuits to prevent arcing of the several contact points which would otherwise take place if the circuit through the motor 30 were completely broken.

In the circuits shown in Figs. 14 and 15, the current flowing through the motor 30 at any time depends upon the combined setting of both the hand and foot controls. Of these two circuits the one shown in Fig. 14 is the easiest to construct, since the movable arms 78 and 178 of the resistance units may be grounded, however, in this case both terminals of the motor 30 must be insulated instead of only one as shown in the detailed drawings of the motor. The other circuit (Fig. 15) has the advantage that if the conduits on the motor side of the resistance units 38 and 40 become grounded, the motor will become deenergized, while if the same thing takes place in the device shown in Fig. 14, the motor will become fully energized and open the throttle valve wide.

In both these circuits the two variable resistance units 38 and 40 are in parallel with each other and in series with the motor 30, ignition switch 286 and battery 36. The difference between them lies in the fact that in the device illustrated in Fig. 14, the motor is connected through the battery 36 to ground while in Fig. 15 the motor is connected directly to ground.

In both of the above circuits the switch with the contact points 128 is not used in the foot control and the movable coil contacting elements 86 and 180 are designed to still be in contact with the end of their respective coils when in idling position.

In the device illustrated in Fig. 16 as in those shown in Figs. 14 and 15, the current in the motor 30 depends upon the combined setting of both the hand and foot throttles, and differs from those circuits in utilizing the high resistance coil 280, thereby making it possible to reduce the current to a minimum in idling position without burning the contact points by repeated arcing.

In this circuit both variable resistors 38 and 40 are designed to allow the contacting members 86 and 180 to run off the end of their respective coils when in idling position. The hand control variable resistor 38 is connected in series with the motor 30, ignition switch 286 and battery 36, while the small end of the foot control coil 40 is connected between the motor 30 and hand control 38. The large end of the foot control coil is connected through the high resistance 280 to ground, while the coil contacting wheel 86 is grounded directly.

In idling position the only current in the motor 30 is that which flows through the high resistance 280, resistance unit 92 and motor 30 all in series. The amount of current thus flowing is not sufficient to energize the motor 30 nor to place any appreciable drain on the battery 36.

If the hand controlled resistor 38 is moved so that the contacting member 178 touches the coil 144, the current flow is through the battery 36, motor 30, resistance unit 144, contacting member 178 and thence to the ground. If the hand control 38 is left in idling position and the foot control is depressed so that the wheel 86 touches the resistance coil 92, the current flow is then through the battery 36, motor 30, resistance unit 92, contacting member 86, arm 78, and thence to the ground. A further movement of either arm 78 or 178 to the left as shown in Fig. 16 will cause a lowering of the resistance in the motor circuit, and since the two resistors 38 and 40 are in parallel, the resistance of the motor circuit and hence the current flowing therethrough will depend upon the combined setting of the two resistors.

In the device illustrated in Fig. 17 like the one shown in Fig. 1, the foot control 40 is designed to regulate the current in the motor 30 independently of the hand throttle setting. This system operates without the use of the switch contact points 128 shown in Figs. 1 and 2, but requires instead that the hand resistor 38 have a third binding post 288 connected to the large end of the resistance coil 144, and that the foot control 40 be provided with a contact strip 290 adjacent the large end of the coil, but insulated therefrom, which makes contact with the wheel 86 when the foot throttle is released.

The small ends of the two resistance coils 92 and 144 are connected together and thence through the ignition switch 286 and battery 36 to ground. The large end of the hand control resistance unit 144 is connected through the binding post 288, high resistance 280, and motor 30 to ground. The movable coil contacting member 178 of the hand control is connected to the strip 290 at the end of the foot control resistance unit 92, while the foot control movable coil contacting wheel 86 is connected between the motor 30 and high resistance 280.

In the above device when both throttle controls 38 and 40 are in the idling position, the flow of current through the motor 30 is very slight and is through the battery 36, ignition switch 286, hand control coil 144, high resistance unit 280 and motor 30 all in series. If the hand throttle control is advanced, the motor is energized through the battery 36, ignition switch 286, coil 144, coil contacting element 178, strip 290, wheel 86, arm 78 and motor 30. If now the foot pedal is depressed, the wheel 86 is moved from the strip 290 to the coil 92 thereby cutting out the hand control 38 and energizing the motor through the battery 36, switch 286, coil 92, wheel 86, arm 78 and motor 30.

It will be seen from the above that the torque motor 30 is under the influence of the hand control 38 until the foot pedal is depressed, at which point the hand control is cut out of the motor circuit and all control taken over by the foot control 40.

An adjustable stop 292 may be provided in connection with the hand control to provide a means for temporarily setting the idling adjustment from the automobile dash board. Ordinarily, this stop 292 will be retracted and is supplied only for emergency use.

The device illustrated in Fig. 18 is provided with a foot control which uses a well known carbon pile resistance unit in a box 294. The motor current is supplied from the battery 36 through the ignition switch 286, carbon pile in the box 294, high resistance unit 280 and motor 30. The foot pedal 42 when depressed compresses the carbon pile through a coil spring 296 and thus varies the resistance through the carbon pile. Connected across the high resistance unit 280 a switch 298 shorts out the high resistance unit during the initial movement of the pedal 42.

In operation the motor current during idling operation flows through the battery 36, ignition switch 286, carbon pile in the box 294, high resistance 280 and motor 30. When the pedal 42 is depressed, the switch 298 is closed and the motor current then flows from the battery 36 through the ignition switch 286, carbon pile in the box 294, switch 298 and motor 30, thus energizing the motor with the carbon pile in series, so that further depression of the pedal 42 lowers the resistance of the circuit and thereby produces greater torque in the motor 30.

The speed governing means comprising a part of this invention consists of a speed responsive resistor 300 (Figs. 19, 20 and 21) which is shown as connected in series with the torque motor and a control circuit similar to the one illustrated in Fig. 1. It should be understood, however, that this governor may be connected in a like manner in any of the foregoing circuits.

Although many forms of speed responsive variable resistors may be used in this manner, the one here shown and described is of the magnetic type and consists of a slider 302 which moves over a resistance coil 304 under the influence of the rotating magnet 306.

The mechanism of this speed responsive resistor comprises a die casting 308 carrying a magnet shaft 310 rotatably journalled therein. This magnet shaft has a suitable gear 312 which meshes with and is driven by the gear 314 which is usually mounted on the transmission end of the propeller shaft of the vehicle. The die casting 308 has a neck 316 which extends into a suitable opening provided in the transmission housing 318, the assembly being held in place by a clamp 320 which engages a flange 322 provided by the die casting. This flange serves the further purpose of preventing the entry of dirt or moisture into the opening in the transmission housing 318 in which the extension 316 is located.

The upper end of the magnet shaft 310 has affixed thereto a cup-shaped magnet support 324 to which is attached a permanent magnet 306 bent into the form of an annulus but having its ends separated by a gap, which may either be left open or which may be filled with non-magnetic material, as desired.

Surrounding the magnet 306 and spaced therefrom is an iron field plate 326 which forms a strong magnetic field between itself and the magnet 306. In this space is located a speed cup 328 formed of aluminum or other suitable material. This speed cup 328 is mounted on a shaft 330 which has one end journalled in a jeweled bearing 332 carried by the upper end of the iron field plate 326. This jeweled bearing 332 insulates the shaft 330 from the field plate 326. The other end of the shaft 330 rests upon a jewel 334 which carries the weight of the shaft 330 and speed cup 328 when the governor mechanism is assembled in normal operating position with the shaft 330 substantially vertical and the jewel 334 at the lower end thereof. A second jewel 336 forms a guide for the shaft 330 and restricts the lateral movement thereof. Both of the jewels 334 and 336 are located in a housing 338 carried by a combined bearing support and oil shield 340, which is made of brass or other non-electromagnetic material. A screw 342 permits adjustment of the jewel 334 and is locked in adjusted position by a nut 344.

The shaft 330 carries the slider 302 which moves over the resistance 304 mounted for rotation in the upper end of the iron field plate 326.

One end of this resistance coil 304 is brought out through a slot 346 in the iron field plate 326 and by means of a pig tail 348, stud 350, and spring 352 is in electrical communication with a terminal 354.

The terminal 354 is carried by the upper end of a cover 356 which is attached to the die casting 308 by screws 358. The cover 356 may be of any suitable material, such as iron, and the terminal 354 is insulated therefrom by insulating discs 360, 362 and 364.

A nut 366 and metal washer 368 clamp the terminal 354, spring 352, insulating discs 360, 362 and 364 to the upper end of the cover 356. A second nut 370 clamps in place one of the electrical conduits 372 in the governor circuit.

The rotation of the magnet 306 tends to rotate the speed cup 328 in the same direction. This rotation of the speed cup, together with its shaft 330 and slider 302 is resisted by a spring 374, which has one end attached to the shaft 330 and a second end secured to a post 376. The post 376 and stud 350 are both mounted on overhanging ends of an insulating plate 378 riveted to the upper end of the field plate 326. The slider 302 and shaft 330 are in electrical communication with the post 376 through spring 374 and also through a contact member 380, which bears lightly against the upper end of the shaft 330. When the governor mechanism 300 is mounted with the shaft 330 in vertical position, this contact member 380 and the weight of the shaft itself and the speed cup 328 suffice to hold the lower end of the shaft 330 against the jewel 334, but where it is desired to so position the governor mechanism that the shaft 330 is not in this vertical position, it is to be understood that a second jewel similar to the jewel 334 will be utilized to limit longitudinal movement of the shaft 330.

The post 376 is electrically connected to a second terminal 382 through a spring 384. This post 376 is insulated from the cover 356 in the same manner in which the post 354 is insulated from this cover. Attached to the post 382 is one end of a wire 386 which connects the slider 302 into the governor circuit.

The annular resistance unit 304 is provided with a threaded boss 388 into which is screwed an adjusting pin 390 extending through slots 392 and 394 in the field plate 326 and cover 356. The pin 390 has an annular slot 396 which engages a spring strip 398 that acts as a cover for the slot 394 and as a frictional element to secure the adjusted setting of the pin 390. This pin 390 is used to rotate the resistance unit 304 and thereby determine the speed to which the governor will limit the vehicle by regulating the degree of movement of the slider 302 before it comes in contact with the coil of the resistance unit 304.

The cover 356 has an annular shoulder 399 which is located above a similar shoulder provided by the iron field plate 326. Between these two shoulders is clamped a corrugated spacing ring 400 provided with inwardly directed fingers 402 which accurately locate the spacing ring 400. By means of this structure, the cover 356 clamps in place on the base of the die casting 308 the iron field plate 326, and this field plate in turn overlies the outwardly directed flange 404 formed at the lower end of the bearing support 340 whereby the latter is also clamped against the base of the die casting 308. The cover 356, iron field plate 326, bearing support 340 and shaft 330 with its associated speed cup 328, can all be removed by simply unscrewing the screws 358 and pin 390. This structure greatly simplifies assembly of the mechanism when it is originally manufactured and also facilitates inspection and repair.

The governor as described, since it is driven from the transmission, will limit the top speed of the vehicle, but will not prevent rapid acceleration in the lower gears.

If it is desired to limit the vehicle to a certain motor speed regardless of road speed, then the governor unit should be driven from the motor. One means for accomplishing this is shown in Fig. 21, in which a motor generator pulley 406 is secured to the generator shaft 408 by means of an internal threaded section 410 on the end of the magnet carrying shaft 310. The threaded section 410 serves as a securing member for the pulley in place of the nut supplied with the vehicle and also as a means for driving the governor from the generator shaft. A bracket 412 fastened at one end to some convenient member of the vehicle motor supports the generator by means of the screws 414 which extend therethrough into the governor flange 322.

In operation the foot throttle 40 or hand throttle 38 may be opened, thereby increasing the current through the motor 30 and opening the carburetor throttle valve. As the car speed increases, the slider 302 will be moved over the resistance unit 304 until the additional resistance added to the torque motor circuit will cause a partial deenergization of the motor 30 and a partial closing of the carburetor throttle valve, thereby limiting the top speed of the vehicle.

In Figs. 22 and 23 is shown a means for connecting the electric governor to a throttle valve controlled by mechanical linkage. The governor unit 300 is similar to the one above described excepting that here as an increase in engine speed moves the slider 302 over the resistance unit 304, resistance is removed from the governor circuit instead of being added thereto. This is accomplished by connecting the opposite end of the resistance unit 304 to the terminal post 354.

The throttle valve control unit consists of a throttle control rod 416 provided with a slidable collar 418 having two oppositely projecting pins 420 and 422. The pin 420 engages a slot 424 in the end of a carburetor valve control rod 426, while the pin 422 engages a similar slot 428 in the end of an oppositely extending rod 430. The rod 430 is pivotally mounted near its center 432 by a screw 434 extending therethrough into a bracket 436. Pivoted to the lower end of the rod 430 is a link 438 which is connected at its opposite end to the torque motor 30. A coil spring 440 is positioned around the control rod 416 with one end bearing against the collar 418 and the other end against an adjustable collar 442 secured to the control rod 416 by the set screw 444.

In operation, a movement of the throttle control rod 416 to the right as seen in Fig. 22 also moves the collar 418 through the spring 440. This movement of the collar 418 opens the carburetor valve through the arm 426 and rotates the armature in the torque motor 30 through the arm 430 and crank bar 438. When the engine speed rises above a predetermined point, the governor 300 will reduce the resistance of the circuit by means of the slider 302 moving over the resistance unit 304, thereby energizing the torque motor 30 from the battery 36. This energization rotates the armature of the torque motor 30 which moves the bar 438 to the right thereby moving the collar 418 to the left against the spring 440 and partially closing the carburetor throttle valve, thus, limiting the speed of the vehicle to the predetermined point.

The carburetor valve is closed by the helical spring 446 secured to the post 448 at one end by the screw 450 and attached at its other end to the arm 426, when the control rod 416 is returned to idling position.

The foregoing detailed description has been given for the purpose of clearness of understanding only, and no unnecessary limitations should be understood therefrom.

Having described our invention, what we claim as new and useful and desire to protect by Letters Patent is:

1. An electric carburetor throttle control comprising the combination of a throttle valve, armature means for shifting said valve, means for supplying current to said armature, and hand and foot control means for varying the current in said armature means, said foot control means cutting out the influence of the hand control means.

2. An electric carburetor throttle control comprising the combination of a throttle valve, armature means for shifting said valve, means for supplying current to said armature, hand and foot control means for varying the current in said armature means, and means for incorporating a high resistance in the armature circuit when both the hand and foot controls are retarded.

3. An electric carburetor throttle control comprising the combination of a throttle valve, armature means for shifting said valve, means for supplying current to said armature means, and hand and foot control means for varying the current in said armature, the current in said armature being determined by the setting of both the hand and foot controls conjunctively.

4. An electric carburetor throttle control comprising the combination of a throttle valve, armature means for shifting said valve, means for supplying current to said armature, hand and foot control means for varying the current in said armature, the foot control comprising a resistance unit in series with the armature means and the current supply means through a high resistance, a pedal actuated slider on said resistance unit in shunt with the high resistance, the hand control comprising a variable resistor in shunt through a switch with the first said resistance unit and the high resistance.

5. An electric carburetor throttle control comprising the combination of a throttle valve, armature means for shifting said valve, means for supplying current to said armature, hand and foot control means for varying the current in said armature, and the hand and foot controls comprising variable resistors in shunt with each other and in series with the current supply and armature.

6. An electric carburetor throttle control comprising the combination of a throttle valve, armature means for shifting said valve, means for supplying current to said armature, hand and foot control means for varying the current in said armature, the hand and foot controls comprising variable resistors in shunt with each other and in series with the current supply and armature, and the free end of one of the variable resistances being grounded through a high resistance.

7. An electric carburetor throttle control comprising the combination of a throttle valve, armature means for shifting said valve, means for supplying current to said armature, hand and foot control means for varying the current in said armature, the hand control comprising a resistance unit in series with the current supply means and the armature means through a high resistance, a slider on said resistance unit; the foot control comprising a separate resistance unit having a connection at one end, the other end being free, a contact strip near the free end and insulated therefrom, a slider to move over the last said resistance unit and contact strip, the contact strip connected to the hand control slider, and the last said resistance unit and slider being bridged across the hand control resistance unit and high resistance in series.

8. An electric carburetor throttle control comprising the combination of a throttle valve, armature means for shifting said valve, means for supplying current to said armature, foot control means for varying the current in said armature means, said foot control means consisting of one or more pedal actuated rollers, and said rollers operating to contact different portions of a resistance unit depending on the degree of depression of the pedal.

9. An electric carburetor throttle control comprising the combination of a throttle valve, armature means for shifting said valve, means for supplying current to said armature, hand and foot control means for varying the current in said armature means, said foot control means consisting of one or more pedal actuated rollers, said rollers operating to contact different portions of a resistance unit depending on the degree of depression of the pedal, a switch adjacent the said resistance unit, the pedal in its extended position operating to close said switch, and said switch when closed adapted to complete a circuit comprising said current supply means, said armature means and said hand control and when open to interrupt the last said circuit.

10. In an electric throttle control system including a circuit with hand and foot control means therein, a throttle valve, electric torque means for shifting the valve, means for supplying current to said torque means, said control means serving to vary the current in said torque means; said torque means comprising a wound armature positioned to rotate within a flux conducting field, resilient means normally to position the poles of the armature canted with respect to the poles of the field, and electrical connections from the armature to the control circuit.

11. In an electric throttle control system including a circuit with hand and foot control means therein, electric torque means for shifting a throttle valve, means for supplying current to said torque means, said control means serving to vary the current in said torque means; said torque means comprising a wire wound armature positioned on a shaft to rotate within a flux conducting field, said armature shaft having stops to limit the arc of rotation of the armature, resilient means normally to position the poles of the armature canted with respect to the poles of the field, the tension of the resilient means and one of the stops being adjustable, electrical connections to the ends of the armature, and an adjustable connection between the armature shaft and the throttle valve.

12. In an electric throttle control system including a circuit with hand and foot control means therein, a throttle valve, electric torque means for shifting the valve, means for supplying current to said torque means, said control means serving to vary the current in said torque means; said torque means comprising a wound armature positioned to rotate within a flux conducting field, resilient means normally to position the poles of the armature canted with respect to the poles of the field, each of said field poles being asymmetrical, and electrical connections from the armature to the control circuit.

13. In an electric throttle control system including a circuit with hand and foot control means therein, a throttle valve, electric torque means for shifting the valve, means for supplying current to said torque means, said control means serving to vary the current in said torque means; said torque means comprising a wound armature positioned to rotate within a flux conducting field, resilient means normally to position the poles of the armature canted with respect to the poles of the field, the distance between the armature and field poles being less at the entering edge of the field than at the leaving edge, and electrical connections from the armature to the control circuit.

14. An electric carburetor throttle control comprising the combination of a throttle valve, armature means for shifting said valve, means for supplying current to said armature, and hand and foot contol means for varying the current in said armature means, said foot control means operative to vary the current in said armature means independently of the setting of said hand control means, and said hand control means operative to vary the current in said armature means only when said foot control means is in substantially one position.

15. In an electric throttle control system including a circuit with hand and foot control means therein, electric torque means for shifting a throttle valve, means for supplying current to said torque means, said control means serving to vary the current in said torque means; said torque means comprising a flux conducting field, an armature positioned to rotate within said flux conducting field, resilient means normally to position the poles of the armature canted with respect to the poles of the field, and the poles of said torque means being shaped so that the torque curve of said torque means and the torque curve of said resilient means will cross at substantially right angles whereby a dead beat action is provided.

16. In an electric throttle control system including a circuit with hand and foot control means therein, an electric torque means for shifting a throttle valve, means to supply current to said torque means, each said control means comprising a variable resistor having a slider and a resistance unit to vary the current in said torque means, said torque means comprising a flux conducting field, an armature positioned to rotate within said field, resilient means normally to position the poles of the armature canted with respect to the poles of the field, the poles of said torque means being shaped so that the torque curve of said torque means and the torque curve of said resilient means will cross at substantially right angles, and each said variable resistor having a tapered resistance unit so proportioned that the ratio between the movement of the slider and the change of motor speed is substantially constant throughout the range of the resistor.

HORACE M. NORMAN.
WILLARD H. FARR.
GEO. E. COXON.
THOROLF PAUL.
ARDEN W. LE FEVRE.